Figure 1:
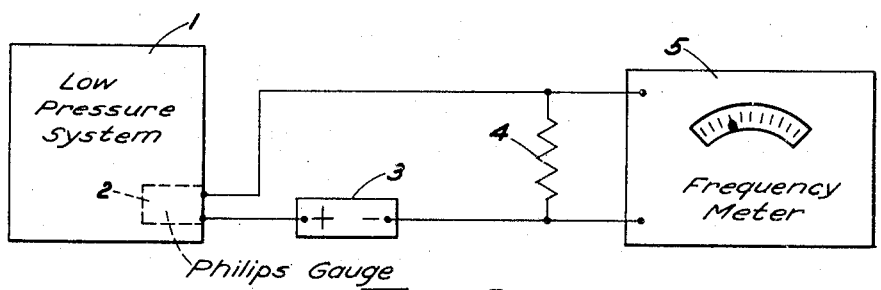

Nov. 1, 1949 W. R. PERRET 2,486,976
PRESSURE MEASURING DEVICE
Filed Aug. 15, 1946

INVENTOR.
William R. Perret
BY
ATTORNEY

Patented Nov. 1, 1949

2,486,976

UNITED STATES PATENT OFFICE 2,486,976

PRESSURE MEASURING DEVICE

William R. Perret, Vicksburg, Miss., assignor, by mesne assignments, to the United States of America as represented by the United States Atomic Energy Commission Application August 15, 1946, Serial No. 690,809

10 Claims. (Cl. 175—183)

This invention relates generally to vacuum system techniques, and more particularly, to appratus for, and methods of, providing information as to the pressure and/or composition of a gas within a vacuum system. The invention is particularly well adapted as a means of detecting and locating leaks within a supposedly vacuum tight system.

The most satisfactory previously known device for measuring gas pressures of the order of one microns or fractions thereof is an oscillation, or electric discharge, type gauge. In such an oscillation type gauge, crossed electric and magnetic fields are superimposed in a portion of the region containing the gaseous medium the pressure of which it is desired to measure. The geometry of these fields is such that in traversing the electric discharge region in the direction of the magnetic field, the electric potential first progresses in the positive direction to a maximum positive value at a central symmetrical plane, and then the potential values are symmetrically retraced in a negative direction on the other side of the central plane. As a result of this unique field configuration, electrons tend to oscillate back and forth between equipotential points on opposite side of the central positive plane of symmetry. Due to the large increase in individual electron travel thus attained, an electric discharge is set up and maintained between the electrodes of the gauge. It is known that the magnitude of this electric discharge is a measure, within limits, of the pressure of the medium gas. In use, an ammeter placed in the external circuit is calibrated to read directly in pressure.

Either an alternating current of perhaps 60 cycles or a direct current power supply may be employed in the external circuit to provide the required electric field for such a pressure gauge. Ordinarily, a direct voltage source of two or three thousand volts is used, in which case the electric discharge is maintained continuously. If an alternating voltage source is employed, then the above-described field configuration necessary to produce electron oscillation exists only on alternative half cycles, and the electric discharge, of course, is maintained only for alternate half cycles. In any case, the average direct current in the external circuit provides an accurate measure of the pressure of the medium gas in which the discharge takes place.

The present inventor has noted that the direct current, which appears in the external circuit of such an oscillation type gauge, has superimposed thereon a high frequency alternating current component. He has also discovered that the frequency of this alternating current component is directly proportional to the pressure of the medium gas, and, in addition, is dependent upon its composition. Typical frequency values for air are 2.2 kilocycles per second at a pressure of 0.002 micron, and 100 kilocycles per second at a pressure of 0.08 micron.

The present inventor has conceived that the above-described characteristic oscillatory nature of the external current of an oscillation type pressure gauge may be advantageously employed for the purposes of measuring gas pressure, detecting changes in the composition of a gas, and in leak hunting. The present invention comprises concrete apparatus and methods for accomplishing these objectives.

Accordingly, it is an object of the present invention to provide an oscillation type pressure gauge having frequency responsive means included in its external circuit.

Another object of the invention is to provide a novel system for measuring gas pressures of an extremely low order of magnitude.

Still another object of the invention is to provide a novel system for detecting changes in the composition of the medium gas of a vacuum system.

A further object of the invention is to provide a novel system for detecting and locating leaks in a supposedly vacuum tight system.

Other objects and advantages of the present invention will become apparent from the following description, when taken in connection with the accompanying drawings.

Figure 3:
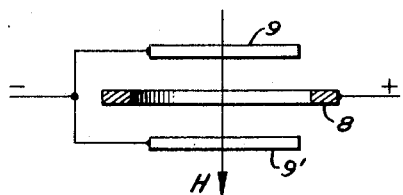
Figure 4:
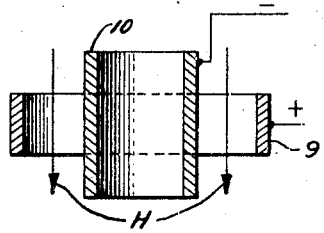
Figure 2:
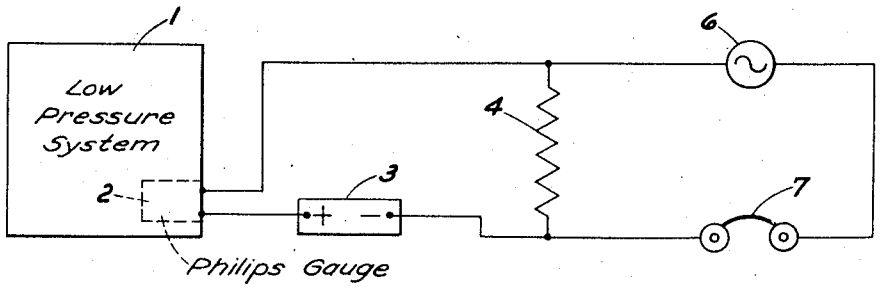

In the drawings,

Figure 1 is a schematic and wiring diagram of an arrangement for measuring gas pressure, Figure 2 is a schematic and wiring diagram of an arrangement for detecting changes in composition of the medium gas within a vacuum system, which arrangement is particularly useful in leak hunting, Figure 3 is a representation of an oscillation type gauge which may be used as the gauge 2 of Figures 1 and 2, and Figure 4 is a representation of another oscillation type gauge which may be used as the gauge 2 of Figures 1 and 2.

Referring now to Figure 1, reference numeral 1 represents a vacuum chamber or system within which is contained a medium gas the pressure of which it is desired to measure. Within the chamber 1 there is schematically indicated an oscillation type pressure gauge 2, the electric discharge region of which will be understood to communicate with the medium gas in the chamber. The external leads for the gauge are brought out through suitable vacuum sealing insulators in the usual manner.

Although any of the many different types of oscillation gauges might be used, for the sake of concreteness, the ordinary commercially available type, commonly known as the Philip's gauge, is specified in the drawings. The Philip's gauge, which is described in detail in U. S. Patent No. 2,197,079 entitled "Method and device for measuring pressures," issued April 16, 1940 in the name of F. M. Penning is shown in Fig. 3. It consists essentially of two spaced parallel plates 9, 9' serving as cathodes and a wire loop 8 therebetween serving as the anode, these electrodes being disposed in a magnetic field H perpendicular to the plates and parallel to the axis of the wire loop.

In Fig. 4, there is shown another suitable type of oscillation type gauge, which is also described in detail in the aforesaid Penning patent. It consists essentially of an annular anode 9 surrounding but spaced from a somewhat longer concentric annular cathode 10, the axis of both of these electrodes extending in the direction of a magnetic field H.

Connected in series across the external leads of the Philip's gauge 2 are a direct voltage source 3, of perhaps two thousand volts, and a high resistance 4. As has previously been stated, the current which flows in this external circuit includes a high frequency component the frequency of which, within limits, is directly proportional to, and therefore may be used as a measure of, the gas pressure within the chamber 1. Accordingly, this high frequency component is measured in any convenient manner, for example, by connecting the input terminals of a conventional frequency meter 5 to spaced points on resistance 4, as shown. If desired, the frequency meter 5 may be suitably calibrated such that it provides a direct reading of the gas pressure within the chamber 1. Such a calibration, however, must be made and utilized for a particular gas composition, since the frequency depends upon the kind of medium gas as well as its pressure.

As is well known, an important problem often encountered in the use of vacuum equipment is that of leak hunting, that is, detecting and locating a leak which has developed in a supposedly vacuum tight system. One method of leak hunting involves probing the exterior surface of the vacuum system with a jet of a gas having a composition differing from that of the medium gas. At the same time a detector which is adapted to respond to changes in composition of the medium gas is maintained in operation. When the operator probes a leak, the jet gas enters the vacuum system anad the resulting change in composition of the medium gas is immediately detected and made evident to the operator. In this way, the operator is enabled to locate leaks in the system.

It will be apparent that the apparatus of Figure 1 lends itself to use as the detector in such a leak hunting procedure. The frequency reading of meter 5, since it depends upon the composition of the medium gas, will change immediately upon the probing of a leak by the operator. However, in this case, the indication which the operator receives is a visible one, and it is difficult and often impossible for him to continue his probing while simultaneously keeping an eye on the frequency meter 5 for changes in frequency. In the apparatus of Figure 2, a change in frequency is made evident to the operator by means of an audible signal, thus permitting him to apply his entire visual attention to the accurate location of the leak.

In the arrangement shown in Figure 2, the frequency meter 5 of Figure 1 is replaced by a series circuit comprising a high frequency oscillator 6 and a head set or pair of earphones 7 to be worn by the operator. The output frequency of oscillator 6 is substantially equal to the normal fremal frequency which apears in the external circuit of the Philip's gauge when no leak is being probed. When the operator probes a leak, however, the characteristic frequency of the gauge discharge changes by a sufficient amount that it heterodynes with the output of oscillator 6 to produce a beat frequency which either will lie in the audible range or will pass right through the audible range. In any case, the probing of a leak will be immediately evidenced to the operator by an audible note in the earphones 7.

Since many changes in the above construction and many apparently widely different embodiments of the invention could be made without departing from the scope thereof, it is intended that all matter contained in the above description, or shown in the accompanying drawings, shall be interpreted as illustrative and not in a limiting sense. In particular, it will be understood that the principles of the invention are equally applicable to the use of an alternating current oscillation gauge instead of a direct current gauge, as shown. In such case, an alternating voltage source would be substituted for the direct voltage source 3, and the high frequency component would then be superimposed on the resulting low frequency half wave pulses in the external cricuit.

What is claimed is:

1. In apparatus of the character described, spaced electrodes disposed within a gaseous medium and forming an interelectrode electric discharge region, an external circuit for said electrodes including means for applying an electrical potential to said electrodes, means for superimposing a magnetic field upon the electric field of said region at an angle with respect thereto, and frequency measuring means connected in the external circuit of said electrodes.

2. In apparatus of the character described, electric discharge means disposed within a vacuum system and having a characteristic oscillatory frequency depending upon the composition of the residual gas in said system, said discharge means including means for establishing an electric field and means for superimposing a magnetic field upon said electric field and at an angle thereto, and an external circuit for said discharge means, said circuit including an oscillator for providing an alternating signal having a frequency of the same order of magnitude as said characteristic oscillatory frequency, whereby a beat frequency is produced in said circuit, and means responsive to said beat frequency.

3. Apparatus, as claimed in claim 2, wherein said last-named means comprises a pair of headphones.

4. In apparatus of the character described, spaced electrodes disposed within a gaseous medium and forming an interelectrode discharge region, means for applying an electrical potential to said electrodes, means for superimposing a magnetic field upon the electric field of said region at an angle with respect thereto, and an external circuit for said electrodes, said circuit including an oscillator for providing an alternating signal having a frequency of the same order of magnitude as the characteristic oscillatory frequency of the electric discharge maintained between said electrodes, whereby a beat frequency is produced in said circuit, and means responsive to said beat frequency.

5. Apparatus, as claimed in claim 4, wherein said last-named means comprises a pair of headphones.

6. The method of testing a supposedly vacuum tight system for leaks comprising the steps of superimposing crossed electric and magnetic fields within said vacuum system to establish an electric discharge therein having a characteristic oscillatory frequency depending upon the composition of the gas within said system, probing the exterior of said system with a gas having a different composition, and physically indicating, in a manner detectable by one of the human senses, any changes which occur in the oscillatory frequency of said discharge.

7. The method of testing a supposedly vacuum tight system for leaks comprising the steps of superimposing crossed electric and magnetic fields within said vacuum system to establish an electric discharge therein having a characteristic oscillatory frequency depending upon the composition of the gas within said system, beating a signal from said discharge against a signal having a substantially equal frequency, probing the exterior of said system with a gas having a different composition, and physically indicating, in a manner detectable by one of the human senses, any changes which occur in the beat frequency.

8. The method of testing a supposedly vacuum tight system for leaks comprising the steps of superimposing crossed electric and magnetic fields within said vacuum system to establish an electric discharge therein having a charac-  teristic oscillatory frequency depending upon the composition of the gas within said system, beating a signal from said discharge against a signal having a substantially equal frequency, probing the exterior of said system with a gas having a different composition, and audibly indicating the attainment of an audio frequency by the beat signal.

9. In apparatus of the character described, means for establishing a magnetic field within a region containing a gas having unknown characteristics, and an electric circuit including means for superimposing upon said magnetic field an electric potential having a positive maximum along the direction of said magnetic field, said circuit also including frequency indicating means responsive to the characteristic frequency of the oscillatory electric discharge occurring within said region.

10. In apparatus of the character described, means for establishnig a magnetic field within a region containing a gas having unknown characteristics, spaced electrodes disposed within said region for establishing an electric field which reverses in the direction of said magnetic field, and an external electrical circuit for said electrodes, said external circuit including a voltage source and frequency responsive means.

WILLIAM R. PERRET.

REFERENCES CITED

The following references are of record in the file of this patent:

UNITED STATES PATENTS

| Number | Name | Date |
|---|---|---|
| 2,081,429 | Gaede | May 25, 1937 |
| 2,197,079 | Penning | Apr. 17, 1940 |
| 2,383,600 | Grosdoff | Aug. 28, 1945 |